(12) United States Patent
Robson et al.

(10) Patent No.: US 7,656,295 B2
(45) Date of Patent: Feb. 2, 2010

(54) MEDIA CONTENT PREVIEW

(75) Inventors: Huw Robson, Cheddar (GB); Weng Wah Loh, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 410 days.

(21) Appl. No.: 11/254,443

(22) Filed: Oct. 20, 2005

(65) Prior Publication Data

US 2006/0113371 A1    Jun. 1, 2006

(30) Foreign Application Priority Data

Oct. 23, 2004    (GB)    .................................. 0423603.0

(51) Int. Cl.
    *G08B 13/14*    (2006.01)
(52) U.S. Cl. ................. 340/572.1; 340/572.8; 235/375; 235/383; 235/436; 381/77; 704/201
(58) Field of Classification Search ............. 340/572.1, 340/572.2, 572.4, 539.23, 573.1, 328; 235/383, 235/436; 381/77; 704/201
    See application file for complete search history.

(56) References Cited

U.S. PATENT DOCUMENTS

| | | | | |
|---|---|---|---|---|
| 5,917,174 A | * | 6/1999 | Moore et al. | ........... 235/462.44 |
| 6,363,239 B1 | * | 3/2002 | Tutt et al. | ................... 434/317 |
| 6,655,586 B1 | | 12/2003 | Back et al. | |
| 6,992,592 B2 | * | 1/2006 | Gilfix et al. | ............. 340/825.19 |
| 2002/0121986 A1 | * | 9/2002 | Krukowski et al. | ..... 340/825.19 |
| 2003/0112973 A1 | * | 6/2003 | Tsutsui et al. | .................. 380/46 |
| 2006/0258289 A1 | * | 11/2006 | Dua | ........................... 455/41.3 |

FOREIGN PATENT DOCUMENTS

| | | |
|---|---|---|
| EP | 0 646 922 A2 | 4/1995 |
| GB | 2 325 544 A | 11/1998 |
| WO | WO 02/11074 A2 | 2/2002 |
| WO | WO 2004/021259 A1 | 3/2004 |

OTHER PUBLICATIONS

Knight-Ridder, "Smart Tags to Replace Bar Codes in the STore of the Future", Jan. 13, 2004, Tribune Business News.*

* cited by examiner

*Primary Examiner*—Davetta W Goins

(57) ABSTRACT

A media product comprising an electronic tag, the tag comprising a memory, wherein the memory has data stored thereon representing preview material associated with the content of the product. A suitable tag and device for querying a memory of the tag are also described.

20 Claims, 4 Drawing Sheets

MEDIA CONTENT PREVIEW

FIELD OF THE INVENTION

The present invention relates to the field of media content preview, and more specifically to the provision of sampling the content of a media product.

BACKGROUND

Promotional material such as sample music tracks and movie previews are often distributed to consumers free in newspapers, magazines and in shops for example. These methods of promotion are expensive and in some circumstances ineffective as potential customers could forget the association between a sample music track or video clip of a movie and the actual CD or DVD for example.

In some stores there exists the provision of so-called 'listening stations'. These generally operate by allowing potential customers to sample music clips of selected products that the store offers. A disadvantage of these 'stations' is that there can be long queues to use them, and generally not all of the entertainment media in the store will be available for preview using the station due to limited storage capacity, and the costs associated with making such media available at a station. Other disadvantages exist, such as the floor space which such stations use for example. Stations adapted for previewing video media are currently very limited, but similar disadvantages exist.

SUMMARY OF THE PRESENT INVENTION

According to a first aspect of the present invention there is provided a media product comprising an electronic tag, the tag comprising a memory, wherein the memory has data stored thereon representing preview material associated with the content of the product.

According to a second aspect of the present invention there is provided packaging for a media product, the packaging comprising an electronic tag, the tag comprising a memory, wherein the memory has data stored thereon representing preview material associated with the content of the product.

According to a third aspect of the present invention there is provided an electronic tag suitable for disposal in or on a media product or a packaging thereof, the tag comprising a memory including preview data relating to a content of a media product.

According to a fourth aspect of the present invention there is provided a method of previewing the content of a media product using a suitable device, the method comprising loading preview data relating to a content of the product into a memory of the device, wherein the device is adapted to present the preview data to a user of the device in a suitable form for previewing a content of the product.

BRIEF DESCRIPTION OF THE DRAWINGS

For a better understanding of the present invention, and to further highlight the ways in which it may be brought into effect, various embodiments will now be described, by way of example only, with reference to the following drawings in which.

It should be emphasized that the term "comprises/comprising" when used in this specification specifies the presence of stated features, integers, steps or components but does not preclude the presence or addition of one or more other features, integers, steps, components or groups thereof.

DETAILED DESCRIPTION

Figure 1:
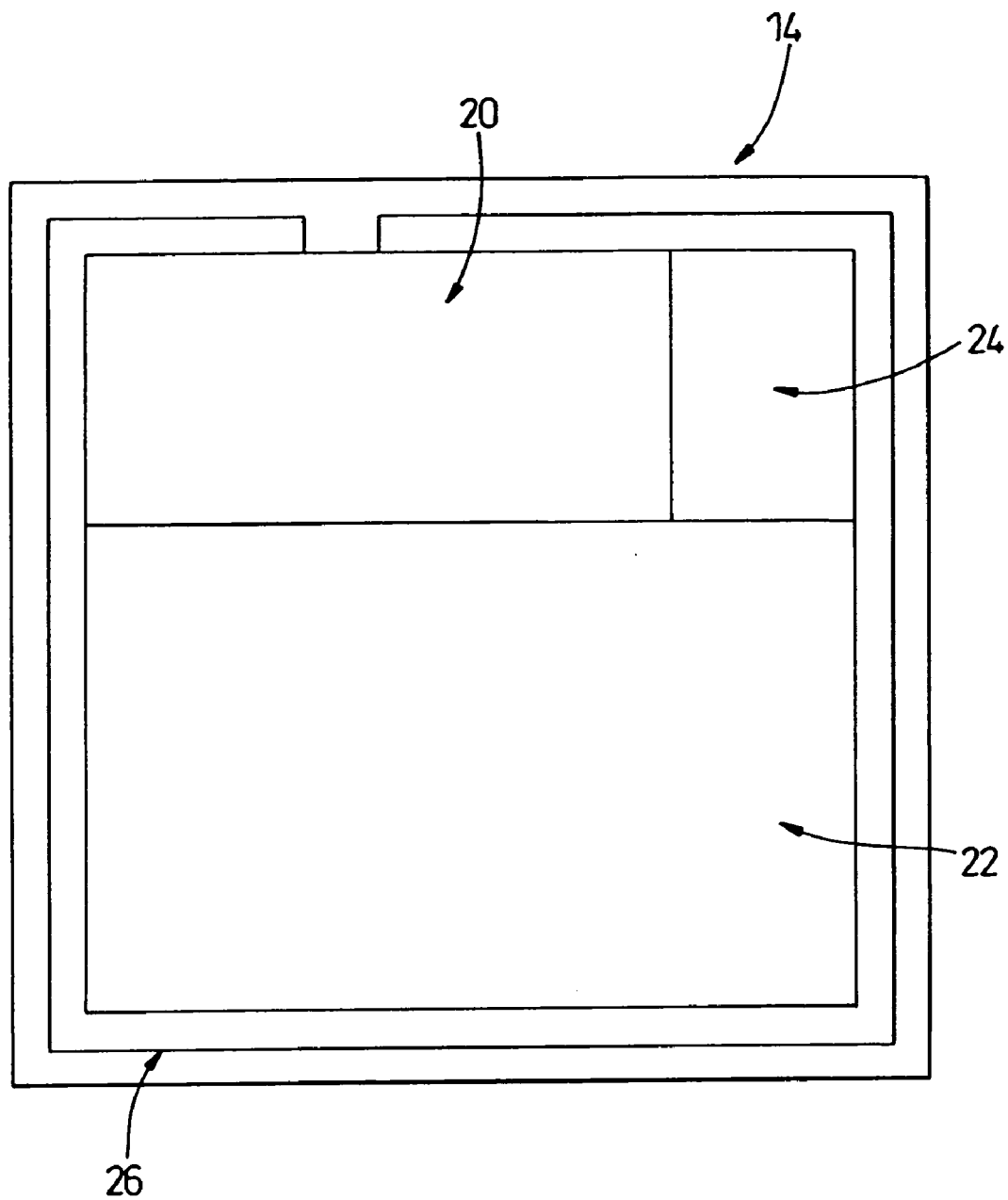
FIG. 1 is a schematic representation of an RFID memory tag suitable for storing media content and operable in accordance with a preferred embodiment.

FIG. 1 of the accompanying drawings is a schematic representation of a memory tag suitable for use in accordance with a preferred embodiment. The tag 14 is provided on a chip, and comprises a circuit 20, a memory 22, a power supply capacitor 24, and an antenna coil 26 having only a few turns, e.g. five, or in this case a single turn. In a preferred embodiment, the circuit 20 operates at a frequency of 2.45 GHz, and is of an area approximately 0.5 mm$^2$ and uses FRAM (ferroelectric random access memory) or MRAM (magnetoresistive random access memory) or similar memory technology characterised by low power requirements. The memory tag 14 is of substantially square shape in plan view with an external dimension D for its sides of around 1 mm. It will appreciated by those skilled in the art that other configurations for tag 14 are possible which have the same functionality, but which can differ in shape and dimensions for example.

Figure 2:
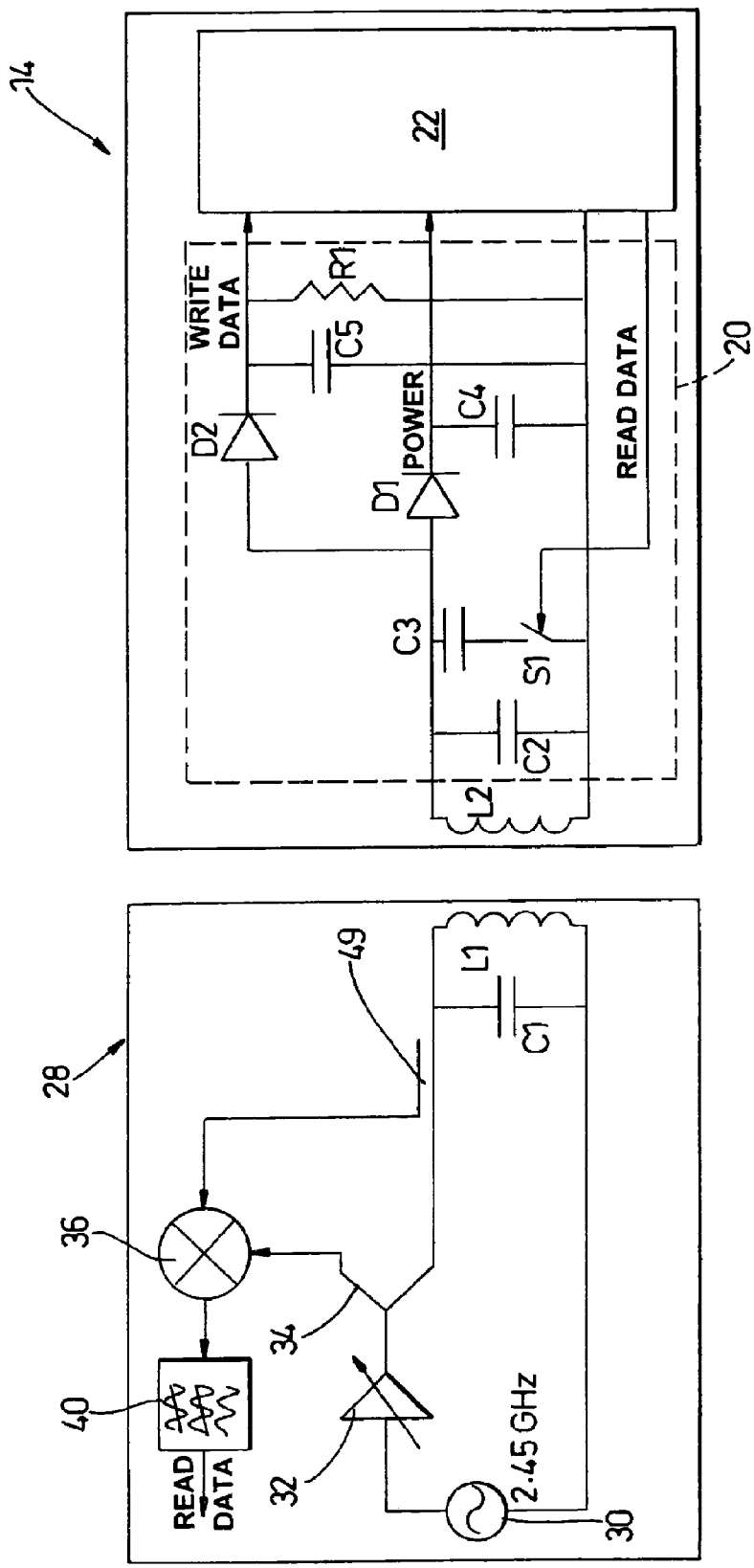
FIG. 2 is schematic representation of circuitry of the tag of FIG. 1 and of corresponding read/write circuitry suitable for wireless communication with the tag.

Referring now to FIG. 2, the circuitry of a memory tag 14 and exemplary read/write circuitry 28 of a device (not shown) are illustrated schematically, using conventional component identifications (C-capacitor, L-inductance, R-resistor, D-diode and S-switch). In an embodiment, the circuit 20 of the memory tag 14 comprises a capacitor C2 which, in combination with the antenna coil L2(26), forms a resonant circuit with component values being chosen to tune the combination to approximately 2.45 GHz for inductive coupling with a read/write device. The portion of circuit 20 responsible for power supply is diode D1 and capacitor C4(24), with diode D1 rectifying the alternating current generated by the inductive coupling and the capacitor C4 acting as a power supply storage. The portion of the circuit 20 responsible for receiving transmitted data from a read/write device is diode D2, capacitor C5 and resistor R1 which form a simple envelope detector; the data thus received is stored in memory 22. The portion of the circuit 20 responsible for the reading of data from the memory 22 is the tuned circuit L2/C2 in combination with S1 and C3, switching C3 in and out of the circuit using S1 changes the resonance of tuned circuit L2/C2 resulting in phase modulation of the reflected power from the memory tag 14 to a read/write device.

Circuit 28 is suitable for use in a device and is operable to effect reading and writing of data to and from the memory tag 14. Read/Write circuit 28 comprises a signal generator 30 which generates a signal at the chosen frequency of 2.45 GHz. For transmitting data to the tag 14, this signal passes via an amplitude modulator 32, where it is amplitude modulated with data to be written to the memory tag 14, and a splitter 34, to an antenna L1 and capacitor C1 which form a tuned circuit. The component values of L1 and C1 being chosen to tune it to 2.45 GHz, as for the tuned circuit in the memory tag 14, in order to maximise inductive coupling between the two circuits, and thus transmission of power and data to and from the memory tag 14.

Although memory tag 14 is described above as operating at 2.45 GHz it should be understood that a memory tag operating at other frequencies may be used. Factors affecting the choice of operating frequency for a memory tag are: a) government regulations concerning radio frequency transmissions; b) adequate bandwidth (consistent with government regulations); c) frequency high enough to render the physical size of components in the memory tag small enough to keep the area of silicon required low (and hence the cost to manufacture low); d) frequency low enough to provide adequate performance when using low-cost high-volume CMOS technology to manufacture the memory tag.

A memory tag of this functional type can be produced using RF technology. Alternatively, optical technologies can be used to power, read and write to a memory tag, as described in the Applicant's earlier British Patent Application No. 0227152.6 for example.

The term 'memory tag' as used herein is not intended to be limiting. Such a term refers to a device substantially as herein described with reference to FIG. 1 for example, which is a device comprising a memory from which data can be read, and to which data can be written, using an inductive coupling of with a read/write device, or using other means such as optical technology for example as described above.

Figure 3:
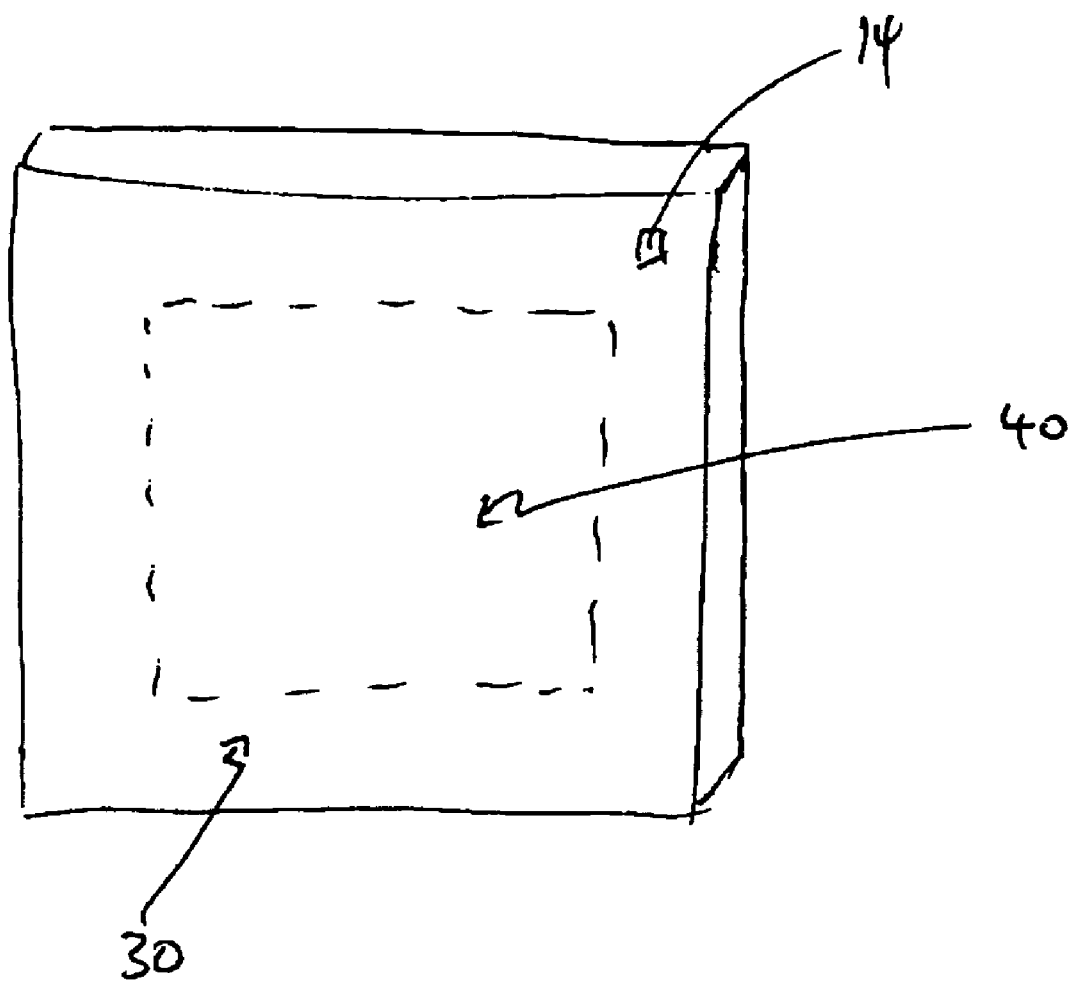
FIG. 3 is a schematic representation of a media product and related memory tag.

According to a preferred embodiment, a tag 14 is embedded in the packaging of a media product, or mounted thereon, or otherwise disposed on or in the product packaging or the product itself, and a memory of the tag comprises data representing preview material of the product. So, for example, the tag can be directly or indirectly (e.g. using the packaging) attached to a suitable product. Referring to FIG. 3, a tag 14 is shown mounted on the packaging 30 of a media product 40. The product 40 can be a music product such as a CD, tape, minidisk, DVD or any other media suitable for storing music, a video-related product such as a videotape, or DVD for example, or even a game product suitable for uploading data onto a games console, PC or other suitable device such as a mobile phone or PDA for example. The tag 14 is adapted to store data in memory 22 relating to the content of the product on which it is disposed, mounted or attached. The tag 14 can be mounted on a disposable packaging of the product 40, or on or in the packaging of product 40 proper (e.g. on or in a CD/DVD jewel case for example).

In the case that a tag 14 is attached to the packaging of a music product such as a CD for example, memory 22 stores preview data relating to the content of the CD. Such content can comprise a playlist of the CD, a sample of at least a track of the CD, or other related information, such as information relating to the artist or group or a sample of a music video for example. A combination of the above can be stored by memory 22. Content can be stored in memory 22 at a lower quality than that stored on the CD/DVD etc, thereby helping to conserve the capacity of memory such that other related content can be stored, or a longer sample can be stored for example. For example, audio preview data can be stored at a lower quality than that of the music product it relates to, and video data can be stored at a lower resolution for example. Lower quality/resolution data can be prepared and uploaded to memory 22. Alternatively, the quality of the preview material stored in memory 22 can worsen over time, or can be valid only for a limited number of plays on a suitable device.

In the case of a video-related product such as a DVD or videotape for example, the content stored in memory 22 of a tag 14 (again, related to the content of the product to which it is mounted, attached or otherwise disposed) can comprise a clip of the content of the product. In the case of a movie, this can be a clip of the movie for example. Other possibilities include storing a movie trailer or clip thereof, or other related information such as a clip of a movie review for example.

In the case of a game for a console or computer for example, stored content/preview material can be a video clip of a portion of the game when running on the console or computer for example. Other alternatives are possible. Again, a video clip can be stored at a lower resolution to conserve space in memory 22, and similarly, audio can be stored at lower quality.

It will appreciated that the exact nature of the content stored in memory 22 (in so much as it is related to the product on which it is attached/mounted etc) can vary greatly. In order to enable an association between the preview material stored in memory 22 and the product itself, such material is advantageously related to the product, but need not be.

In a preferred embodiment, data stored in memory 22 of tag 14 is adapted to be read by a suitable device which can belong to a consumer, or be the property of a store in which products such as those described above are sold, and which is therefore useable by visitors to the store in order to sample media products sold by the store. Such a device can be a mobile station such a mobile telephone for example, a PDA or other device adapted to read information from the tag 14.

Figure 4:
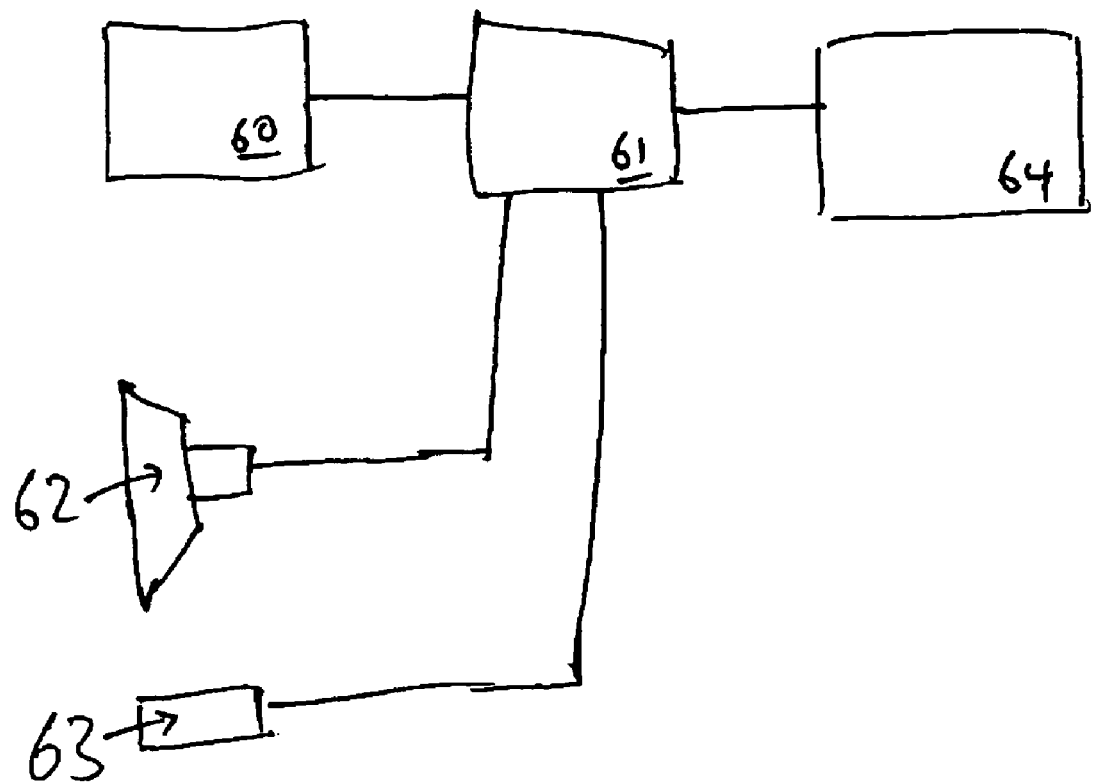
FIG. 4 is a schematic representation of a mobile device incorporating the read/write circuitry of FIG. 2.

In this connection, FIG. 4 is a schematic representation of a suitable device 60 incorporating the read/write circuitry 28 of FIG. 2. The circuitry 28 of device 60 is operable to read data stored in memory 22 of tag 14. The device comprises a processor 61 operable to process such data. Device 60 can additionally comprise a speaker 62 or conventional audio jack or similar 63 for receiving headphones (not shown) or other listening equipment. Thus, if data read by device 60 from tag 14 includes audio content, this can be played to a user of device 60 using the speaker 62 or via the jack 63 using suitable headphones or similar.

Alternatively, or as well as that described above, device 60 can comprise a suitable display 64 such as an LCD, LED or OLED display for example. Other alternatives are possible as will be appreciated by those skilled in the art. If memory 22 comprises video data, perhaps encoded using a suitable encoding algorithm such as MPEG-x, DivX, XVid or similar for example, such video can be displayed to a user of device 60 using display 64. It will appreciated that memory 22 can comprise audio and video data, which will generally be related to one another (especially in the case of a movie clip for example), in which case device 60 is operable to display video data and output audio substantially simultaneously.

Accordingly, a device 60 is operable to query a memory 22 of tag 14, which tag is disposed, attached or otherwise mounted in or on a media product 40. Memory 22 is operable to store preview data relating to the content of the product 40, and the user of device 60 is therefore able to sample the content of the product 40 in an efficient and convenient (to both store and consumer) manner. It will appreciated that device 60 can comprise circuitry adapted to only read data stored in memory 22 of tag 14, and corresponding write functionality need not be present in device 60.

It will be further appreciated by those skilled in the art that the above provisions lend themselves to allowing a user of a device to control a number of content previews at one time. For example, a number of previews can be effectively queued in a device, with a user specifying which one to sample first, or it being done automatically by the device.

The invention claimed is:

1. A media product comprising an electronic tag, the tag comprising a memory, wherein the media product comprises audio or video related content and the data represents a portion of the related content of the product, wherein the memory has data stored thereon representing preview material associated with content of the product and the content represented by the data is stored in the memory at a lower quality than that of the content of the media product.

2. A product as claimed in claim 1, wherein the data is audio and/or video data preview material.

3. A product as claimed in claim 1, wherein the media product is any of a CD, DVD, video game, video cassette, or audio cassette.

4. A product as claimed in claim 1, wherein the memory is adapted to be wirelessly queried such that the data can be read without breaking a packaging of the product.

5. A product as claimed in claim 1, wherein the media product comprises video related content, and the data represents a portion of the video related content of the product.

6. Packaging for a media product, the packaging comprising an electronic tag, the tag comprising a memory, wherein the memory has data stored thereon representing preview material associated with the content of the product and the content represented by the data is stored in the memory at a lower quality than that of the content of the media product.

7. Packaging as claimed in claim 6, wherein the data is audio and/or video data preview material.

8. Packaging as claimed in claim 6, wherein the media product is any of a CD, DVD, video game, video cassette, or audio cassette.

9. Packaging as claimed in claim 6, wherein the memory is adapted to be wirelessly queried such that the data can be read without breaking or removing the packaging from the product.

10. An electronic tag suitable for disposal in or on a media product or a packaging thereof, wherein the media product comprises audio or video related content, and the preview data represents a portion of the related content of the product, the tag comprising a memory including preview data relating to a content of a media product, wherein the content represented by the preview data is stored in the memory at a lower quality than that of the content of the media product.

11. A tag as claimed in claim 10, wherein the preview data is audio and/or video data preview material.

12. A tag as claimed in claim 10, wherein the media product is any of a CD, DVD, video game, video cassette, or audio cassette.

13. A tag as claimed in claim 10, wherein the memory is adapted to be wirelessly queried such that the preview data can be read without breaking or removing a packaging of the product.

14. A tag as claimed in claim 10, wherein the media product comprises video related content, and the preview data represents a portion of the video related content of the product.

15. A device for querying the tag of claim 10 comprising at least one of a display, audio output means or video output means for outputting at least a portion the preview data.

16. A method of previewing the content of a media product using a suitable device, the method comprising:
    loading preview data relating to a content of the product into a memory of the device, wherein the media product comprises audio or video related content, and the preview data represents a portion of the related content of the product, wherein the device is adapted to present the preview data to a user of the device in a suitable form for previewing a content of the product and the content represented by the preview data is stored in the memory at a lower quality than that of the content of the media product.

17. A method as claimed in claim 16, further comprising:
    reading identification data from the product using the device, the data identifying the product and/or the content thereof; and
    loading preview data on the basis of the identification data.

18. A method as claimed in claim 16, wherein the preview data is stored in a memory tag attached to, mounted or otherwise disposed on the product, and wherein loading preview data includes querying a memory of the tag using the device for preview data.

19. A method as claimed in claim 18, wherein the memory is queried using a wireless communication link between the device and the tag.

20. A method as claimed in claim 18, wherein the device and the tag are inductively coupled.

* * * * *